United States Patent Office 3,554,677
Patented Jan. 12, 1971

3,554,677
ROTARY PISTON ENGINE
Gerhard Zapf, Krebsoge, Rhineland, and Jörg Niessen, Radevormwald, Germany, assignors to Sintermetallwerk Krebsoge G.m.b.H., Krebsoge, Rhineland, Germany
Filed May 7, 1969, Ser. No. 822,399
Claims priority, application Germany, May 14, 1968, 1,751,340
Int. Cl. F04c 15/00
U.S. Cl. 418—178
10 Claims

ABSTRACT OF THE DISCLOSURE

A rotary piston engine has a housing with a trochoidal surface in which a rotor rotates, the rotor having sealing strips which rub against the trochoidal surface of the housing and both the trochoidal surface and the rubbing surfaces of the strips being coated with abrasion resistant layers of aluminium oxide, zirconium oxide or chromium oxide. The abrasion resistant layer on the trochoidal surface is from 0.2 to 0.4 mm. thick and an intermediate layer of a nickel iron alloy or a nickel chromium alloy of from 5 to 100μ thick is interposed between this abrasion resistant layer and the trochoidal surface. The abrasion resistant layers on the sealing strips are made of a material of smaller abrasion resistance than that of the layer on the trochoidal surface. In the application of the intermediate and abrasion resistant layers to the trochoidal surface which has inlet and exhaust ports and an opening for a sparking plug, the trochoidal surface is roughened mechanically, the intermediate layer is applied, a coating is applied over the surfaces of the ports of the opening and finally the abrasion resistant layer is applied by flame spraying.

---

This invention relates to rotary piston engines which have a housing with a trochoidal internal surface. In which a rotor rotates, the rotor having sealing strips which rub against the trochoidal internal surface. The invention also relates to processes for applying an abrasion resistant layer to these trochoidal sufaces and to the sealing strips.

Usually in such engines the or each trochoid forming the housing consists of a body of constant cross-section. Several trochoids can if desired be assembled side by side to form the housing.

In order to reduce the high rate of abrasion between the inner trochoidal surfaces of the trochoids and the rotor or rotors of the engine it is known to apply an abrasion resistant layer to these trochoidal surfaces, and to provide the rotors with sealing strips which are either made entirely of an abrasion resistant material, or have rubbing surfaces made of an abrasion resistant material. Difficulties are however encountered not only in choosing the abrasion resistant materials, which must withstand the operating conditions in such engines, but also in developing a suitable process for applying the abrasion resistant layers. When the engine is in operation the abrasion resistant layer can easily separate from its substrate, breaking away due to insufficient bond.

One possible way of increasing abrasion resistance is to apply galvanically to the surface a layer of nickel containing embedded particles of a hard, abrasion resistant material such as silicon carbide. However a layer of this kind has only a short working life, compared with ceramic materials which are much more abrasion resistant, notably aluminium oxide, zirconium oxide or chromium oxide.

On the other hand the application of ceramic layers of this kind for protecting the trochoidal rubbing surfaces against abrasion has hitherto encountered apparently insurmountable difficulties. A ceramic layer applied by the known methods of flame spraying or by plasma jets, easily bursts away from its metal substrate, due to the brittleness and the low co-efficient of thermal expansion of the ceramic material, both during the cooling period after application of the layer, and subsequently as a result of thermal stressing during operation of the engine.

A method for improving adhesion between the ceramic layer and the metal substrate consists in applying to the substrate a metal intermediate layer of nickel/chromium steel, molybdenum, copper or aluminium. The difficulty remains that the edges of the layer are sensitive to mechanical damage. Further difficulties are encountered where the trochoidal surface has openings, for example inlet and exhaust ports, which unavoidably also become coated.

A further difficulty in obtaining satisfactory ceramic coatings is that the flame spraying process leaves an overlapping edge or crown of ceramic material around the edge of the trochoidal surface, the ceramic material encroaching on the flat end surface of the trochoid. This overflowing edge of ceramic material must be cut away when the sides of the trochoid are machined flat, this being necessary to obtain a flush fit between adjacent trochoids when several of these form the housing. In cutting away the projecting ceramic edge, the ceramic material tends to break away, due to its high brittleness, with the result that the edges are not clean, that is to say here are broken away gaps. Similar difficulties are encountered in removing the ceramic material from the insides of the ports and the ignition aperture.

The object of the present invention is to overcome these difficulties and in particular to improve adhesion between the ceramic layer and its substrate, and to prevent breaking away of the ceramic material when the sides of the trochoids are being machined flat, and when openings such as inlet and exhaust ports are being reamed clean.

We have discovered that success depends critically on the preliminary preparation of the surface to which the layer is applied and on the thicknesses of an intermediate layer and the abrasion resistant layer.

According to this invention, in a rotary piston engine having a housing with a trochoidal internal surface in which a rotor rotates, the rotor having sealing strips which rub against the trochoidal surface of the housing and both the trochoidal surface and the rubbing surfaces of the strips being coated with abrasion resistant layers of aluminium oxide, zirconium oxide or chromium oxide, the abrasion resistant layer on the trochoidal surface is from 0.2 to 0.4 mm. thick and an intermediate layer from 5 to 100μ thick of a nickel/iron alloy or a nickel/chromium alloy is interposed between this abrasion resistant layer and the trochoidal surface, the abrasion resistant layers on the sealing strips being made of a material of smaller abrasion resistance than that of the layer on the trochoidal surface. The material used for the intermediate layer must have a co-efficient of expansion which is somewhere between that of the metal substrate and that of the ceramic abrasion resistant layer. In the case of an aluminium substrate the material for the intermediate layer should be nickel/chromium alloy containing 80% nickel and 20% chromium whereas in the case of cast iron, a nickel/iron alloy containing up to 40% nickel should be used.

Preferably, the edges of the trochoidal surface at the end faces of the housing are formed with grooves which are filled with the material of the abrasion resistant layer over the intermediate layer.

The ceramic material filling the groove improves adhesion near the edges of the trochoidal surface, so that the end faces of the trochoid can be machined flat without any risk of the ceramic material breaking away. According to a further preferred feature of the invention each sealing strip also has a groove in that edge to which the abrasion resistant layer is applied and an intermediate layer of a nickel/iron alloy or a nickel/chromium alloy is interposed between the surface of the groove and the abrasion resistant layer. Thus the ceramic material is embedded in the edge of the sealing strip and cannot break away from its substrate. The ceramic working edge of each sealing strip has an arched surface, only the crest of the arch coming into contact with the trochoidal surface.

Both the intermediate layer and the ceramic abrasion resistant layers are applied, to the trochoidal surface where this has inlet and exhaust ports and an opening for a sparking plug, and to the edges of the sealing strips, by flame spraying, preferably by a process in which the surface is roughened mechanically, the intermediate layer is applied, a coating is applied over the surfaces of the ports and opening and finally the abrasion resistant layer is applied by flame spraying. The surfaces of the ports and opening are coated with a covering layer so that the abrasion resistant material which becomes deposited on these surfaces during the flame spraying can be removed easily. The surfaces of the ports and opening can be coated for this purpose with a lacquer, or with the material of the intermediate layer. The coating of lacquer allows the abrasion resistant material to be removed easily from these surfaces, and a metal coating can be machined away.

An example of an engine and of a process in accordance with the invention will now be described with reference to the accompanying drawings in which.

Figure 1:
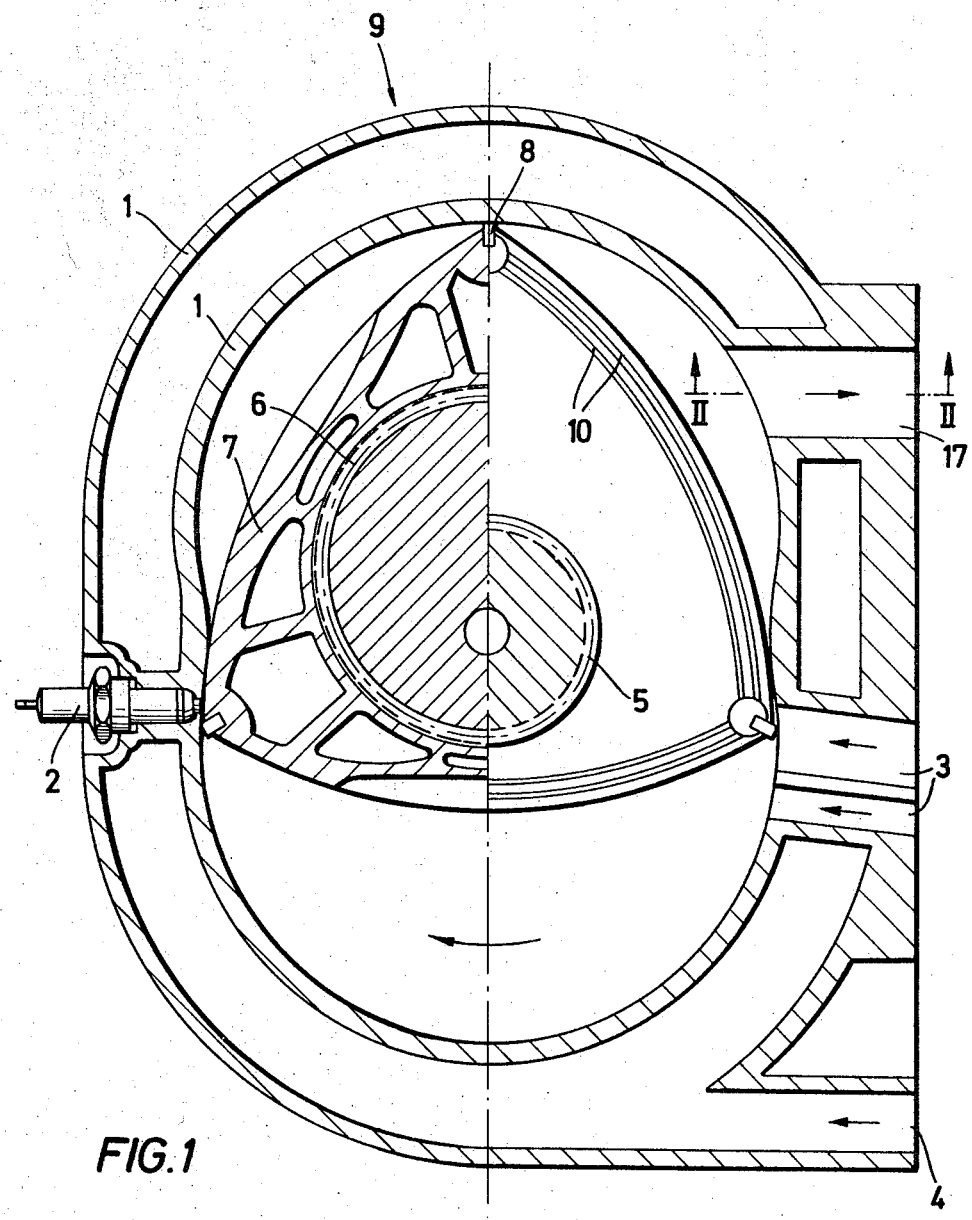
FIG. 1 is a diagrammatic cross-section through the engine, showing the rotor and the housing with the rotor partly in section and partly in elevation.

The engine has a housing comprising an assembly of trochoids 9, 11, each trochoid consisting of an outer casing and an inner trochoidal surface 1. A sparking plug 2 is fitted at an opening through the surface 1, which also has an inlet port 3 and an exhaust port 17. A further port 4 for coolant leads to the space between the outer casing and the inner surface 1. The power delivered by a rotor 7 is transmitted to the drive shaft by means of an inner toothed wheel and an outer toothed wheel 5, 6.

Figure 2:
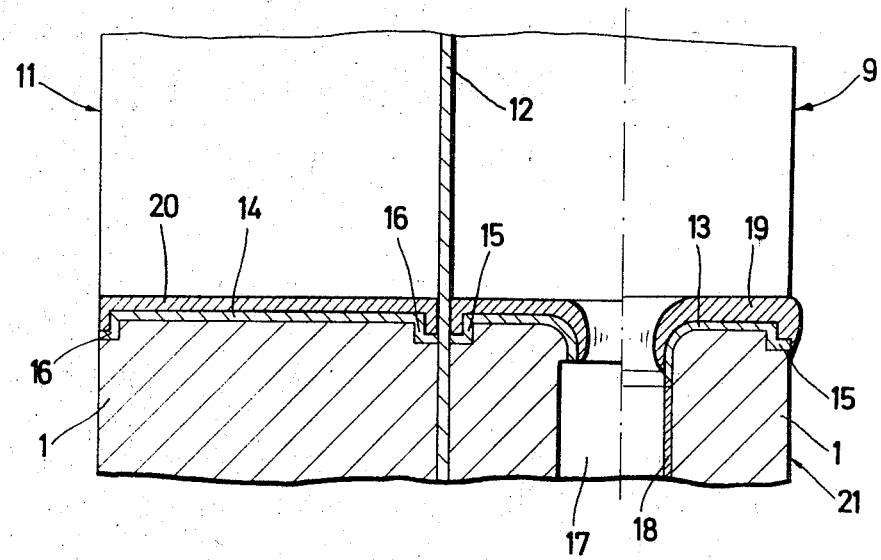
FIG. 2 is a section as seen in the direction of the arrows on the line II—II in FIG. 1.
Figure 3:
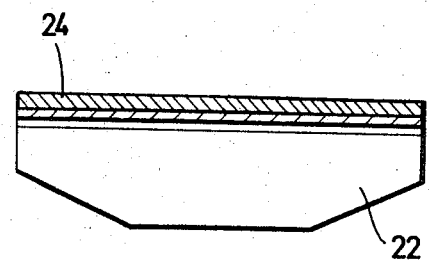
FIG. 3 shows a sealing strip partly in longitudinal section.

Three sealing strips 8 on the rotor produce line contact with the inner surface 9, 11 of which there may be more than two, are assembled together with the interposition of separating walls 12, so that separate working cylinders are formed each with its own rotor. Each rotor is sealed at the side against the walls 12 by means of curved sealing strips 10. The rubbing surface 1 of each trochoid is coated with a metal intermediate layer 13, 14 of nickel/iron or nickel/chromium alloy between 5 and 100μ thick. This extends into the grooves 15, 16 and into the port 17. As shown on the extreme right in FIG. 2, the inner surface of the port 17 is given a metal or lacquer coating 18, before application of an abrasion resistant layer, to facilitate the removal of any abrasion resistant material which may become deposited here during a subsequent flame spraying operation. The intermediate layers 13, 14 act as bonding layers for bonding ceramic abrasion resistant layers 19, 20 from 0.2 to 0.4 mm. thick to the metal substrate of the trochoids. Ceramic abrasion resistant material applied by flame spraying fills the grooves 15, 16. When the flame spraying has been completed, the ceramic layer 19, 20 not only fills the grooves 15, 16 but also projects somewhat at the edges out beyond the end face 21 of the trochoid 9, as shown at the extreme right in FIG. 2.

This projecting edge of abrasion resistant material 19 can easily be cut away during the machining operation for flattening the end face 21 of the trochoid the groove 15 itself remaining full of abrasion resistant material. A reaming operation is then carried out to remove the metal coating 18 and the abrasion resistant layer from the inner surface of the port 17, so that a clean bore free from applied layers is obtained, as shown on the left in FIG. 2. Finally the rubbing surface 1 of the trochoid is machined to give a smooth surface 20 as shown on the left in FIG. 2.

Figure 4:
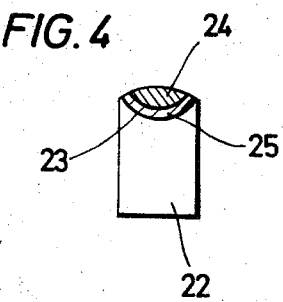
FIG. 4 is a cross section through the sealing strip shown in FIG. 3.
Figure 5:
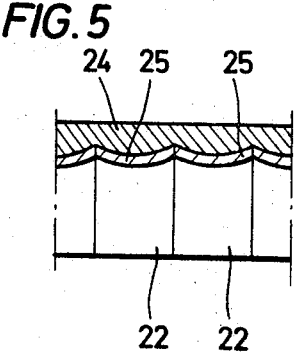
FIG. 5 is a cross section through a pack of sealing strips just after the abrasion resistant material has been applied to the edge of the pack.

The sealing strips 8 and further strips 22 each have a U-shaped groove 23 in their rubbing edges. The groove 23 is filled with abrasion resistant material 24, applied over an intermediate metal layer 25, which has a suitable co-efficient of expansion. The abrasion resistant material is therefore embedded in the edge of the sealing strip. The abrasion resistant material is, in this example, applied as follows: A number of sealing strips 23 are first of all assembled side by side, so that their working edges form a surface. The abrasion resistant material is applied to this surface. The sealing strips are then separated from each other, and the abrasion resistant material remaining on the working edge of each sealing strip is rounded off, that is to say is ground to form an arched surface, as shown in FIG. 4. The resulting sealing strip rubbing edge has a curvature such that only the crest of the arch comes into contact with the surface 20 of the trochoid. The abrasion resistant material cannot break away from the edge of the sealing strip, because it is held in the groove, that is to say is embedded in the edge of the sealing strip.

The abrasion resistant material coating the rubbing surface of the trochoid is preferably aluminum oxide, whereas the abrasion resistant material used for the sealing strips is preferably zirconium oxide, which has a smaller resistance to abrasion. This is to ensure that the sealing strips, which are easier to replace, wear down sooner than the less accessible trochoid rubbing surfaces.

We claim:

1. In a rotary piston engine including a housing, means within said housing defining a trochoidal internal surface, a rotor, means mounting said rotor for rotation within said trochoidal surface, sealing strips mounted on said rotor, said sealing strips rubbing against said trochoidal surface as said rotor rotates and abrasion resistant layers of aluminium oxide, zirconium oxide or chromium oxide coating said trochoidal surface and portions of said sealing strips which rub against said trochoidal surface, the improvement wherein said abrasion resistant layer on said trochoidal surface is from 0.2 to 0.4 mm. thick and wherein an intermediate layer is provided interposed between said abrasion resistant layer and said trochoidal surface, said intermediate layer consisting of nickel iron alloy or nickel chromium alloy and being from 5 to 100μ thick, said abrasion resistant layers on said sealing strips consisting of material of smaller abrasion resistance than that of said layer on said trochoidal surface.

2. An engine as claimed in claim 1, including end faces on said housing, said end faces intersecting said trochoidal surface at edges of said surface and means defining grooves along said edges, said groove being filled with said material of said abrasion resistant layer over said intermediate layer.

3. An engine as claimed in claim 1, wherein each of said sealing strips includes means defining a longitudinally extending groove and further comprising an intermediate layer of nickel/iron alloy or nickel/chromium alloy in said groove and said abrasion resistant layer on said sealing strip extending over said intermediate layer in said groove and protruding from said groove.

4. An engine as claimed in claim 1, wherein said abrasion resistant layer on said trochoidal surface is aluminium oxide and said abrasion resistant layers on said sealing strips are zirconium oxide.

5. An engine as claimed in claim 1, wherein said abrasion resistant layer on each of said sealing strips includes means defining an arched outer surface thereon.

6. An engine as claimed in claim 1, wherein said nickel/iron alloy contains 40% nickel or said nickel/chromium alloy consists of 80% nickel and 20% chromium.

7. In a process for manufacturing a rotary piston engine including a housing, means within said housing defining a trochoidal internal surface and means defining inlet and exhaust ports and a spark plug opening in said surface, and an abrasion resistant layer of aluminium oxide, zirconium oxide or chromium oxide coating said trochoidal surface, the improvement comprising the steps of mechanically roughening said surface, applying an intermediate layer consisting of nickel/iron alloy or nickel/chromium alloy from 5 to 100μ thick to said roughened surface, applying a coating over internal surfaces of said ports and said spark plug opening and finally applying said abrasion resistant layer, which has a thickness of from 0.2 to 0.4 mm., to said intermediate layer by flame spraying.

8. A process as claimed in claim 7, wherein said coating applied to said internal surfaces of said ports and said opening is of lacquer.

9. A process as claimed in claim 7, wherein said coating applied to said internal surfaces of said ports and said opening is of the same material as that of said intermediate layer.

10. A process as claimed in claim 7, wherein said engine further comprises a rotor, means mounting said rotor for rotation within said trochoidal surface, sealing strips mounted on said rotor, said sealing strips rubbing against said trochoidal surface as said rotor rotates and abrasion resistant layers of aluminium oxide, zirconium oxide or chromium oxide coating portions of said sealing strips which rub against said trochoidal surface, said process further comprising assembling said sealing strips side by side to form a pack with said rubbing portions of said strips arranged adjacent each other, applying an intermediate layer consisting of nickel/iron alloy or nickel/chromium alloy from 5 to 100μ thick simultaneously to said rubbing portions of said strips in said pack, applying said abrasion resistant layers to a thickness of from 0.2 to 0.4 mm. to said rubbing portions of said strips simultaneously and separating said strips in said pack from each other, the surface of said abrasion resistant layer on each of said strips being rounded to make it arched and said abrasion resistant layers on said strips being of material of smaller abrasion resistance than that of said layer on said trochoidal surface.

References Cited

UNITED STATES PATENTS

| | | | |
|---|---|---|---|
| 1,955,250 | 4/1934 | Ogden | 103—216(M) |
| 3,033,180 | 5/1962 | Bentele | 103—216(M) |
| 3,102,518 | 9/1963 | Anderson | 103—216(M) |
| 3,155,313 | 11/1964 | Bentele | 103—216(M) |
| 3,289,649 | 12/1966 | Lamm | 103—216(M) |
| 3,394,877 | 7/1968 | Hantzsche et al. | 230—145 |
| 3,360,191 | 12/1967 | Yamamoto | 230—145 |

MARK NEWMAN, Primary Examiner

W. J. GOODLIN, Assistant Examiner